(12) United States Patent
Balzano

(10) Patent No.: US 6,189,931 B1
(45) Date of Patent: Feb. 20, 2001

(54) CARGO CARRIER

(75) Inventor: Joseph A. Balzano, Woodbury, NJ (US)

(73) Assignee: South Jersey Port Corporation, Camden, NJ (US)

(*) Notice: Under 35 U.S.C. 154(b), the term of this patent shall be extended for 0 days.

(21) Appl. No.: 09/439,664

(22) Filed: Nov. 15, 1999

Related U.S. Application Data

(60) Continuation of application No. 08/462,951, filed on Jun. 5, 1995, now abandoned, which is a division of application No. 08/193,243, filed on Feb. 8, 1994, now Pat. No. 5,567,112.

(51) Int. Cl.$^7$ .................................................. B62D 63/06
(52) U.S. Cl. ............................ 280/789; 152/323; 180/22; 180/24.03
(58) Field of Search ................................ 280/789, 781, 280/790; 301/36.1, 62, 63.1, 86; 180/22, 21, 24.03; 152/323

(56) References Cited

U.S. PATENT DOCUMENTS

| 1,440,065 | 12/1922 | Donnelly | 280/33.05 |
|---|---|---|---|
| 2,452,789 | 11/1948 | Pike | 214/15 |
| 2,660,319 | 11/1953 | Dorland | 214/15 |
| 2,714,040 | 7/1955 | Schroeder | 301/13 |
| 2,741,489 | 4/1956 | Bigge | 280/44 |
| 2,789,714 | 4/1957 | Norris | 214/506 |
| 2,832,486 | 4/1958 | Clark | 214/506 |
| 3,024,919 | 3/1962 | Willison et al. | 212/14 |
| 3,413,027 | 11/1968 | Bohlin et al. | 294/81.55 |
| 3,606,056 | 9/1971 | Morgan | 294/81.55 |
| 3,820,664 | 6/1974 | Lewis et al. | 414/140.3 |
| 3,913,933 | 10/1975 | Visser et al. | 280/404 |
| 4,101,144 | 7/1978 | Ross et al. | 280/423 |
| 4,185,862 | 1/1980 | Slocombe | 294/81.55 |
| 4,262,923 | 4/1981 | Weir | 280/423 |
| 4,737,069 | 4/1988 | Clobentz | 294/74 |
| 4,806,065 | 2/1989 | Holt et al. | 296/182 |
| 4,881,859 | * 11/1989 | Ehrlich | 280/789 |
| 5,042,840 | 8/1991 | Rieple et al. | 280/421 X |
| 5,114,169 | 5/1992 | Botkin et al. | 280/400 X |
| 5,256,024 | 10/1993 | Ross | 414/483 |
| 5,259,647 | 11/1993 | Sanden | 280/789 |
| 5,417,539 | 5/1995 | van der Wal | 280/401 X |

OTHER PUBLICATIONS

ITL Industrial Tires, Inc., Specification, 2 Pages.
Fruehauf Co. Price Quote, Drop Frame Flat Bed Trailers, with Specs., Feb. 26, 1993, 2 Pages.
Dorsey Trailers, Sales Order, Specifications, Feb. 26, 1993, 3 Pages.
Florig Equipment Company, Inc.; Price Quote, 12' Trailer; Mar. 3, 1993; 1 Page.
Florig Equipment Company, Inc.; Price Quote, Step Deck Trailer; Feb. 26, 1993, 1 Page.

* cited by examiner

Primary Examiner—Eric Culbreth
(74) Attorney, Agent, or Firm—Volpe and Koenig, P.C.

(57) ABSTRACT

A cargo transfer carrier for use in the unloading of break bulk goods. The cargo carrier has a plurality of longitudinal frame members connected by a plurality of cross members with decking affixed thereto to form a horizontal carrier bed. The bed is of sufficient size to accommodate the placement of at least ten, but preferably 14 sling loads of break bulk goods thereon with the allowance for a perimeter work area. A gooseneck portion with a tractor attachment is supported by a first end of the bed and a plurality of wheel assemblies having solid tires are mounted at the opposite end of the bed.

8 Claims, 2 Drawing Sheets

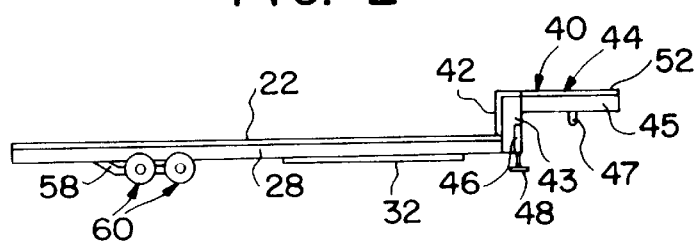
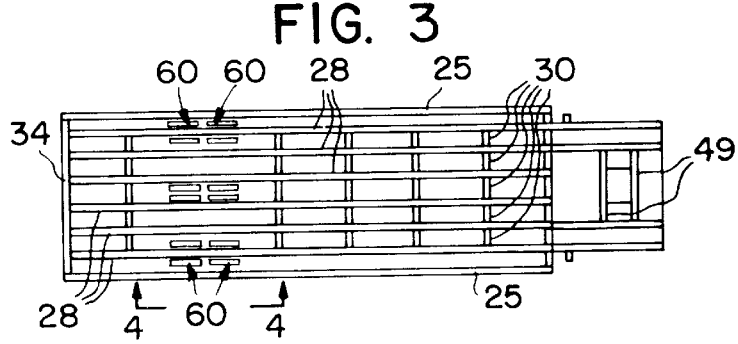
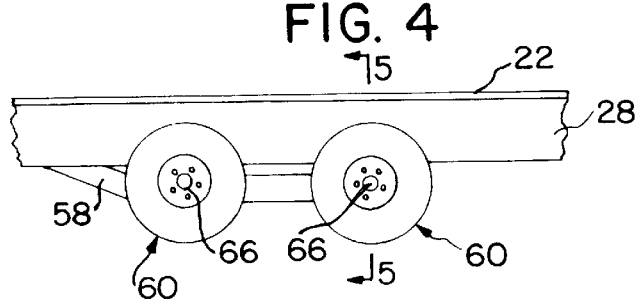

CARGO CARRIER

CROSS REFERENCE TO RELATED APPLICATIONS

This application is a continuation of application Ser. No. 08/462,951, abandoned; filed Jun. 5, 1995, which is a divisional of application Ser. No. 08/193,243; filed Feb. 8, 1994, now U.S. Pat. No. 5,567,112.

FIELD OF THE INVENTION

The present invention relates generally to a method for off-loading break bulk goods from a ship utilizing a specially designed cargo carrier. More particularly, the present invention provides a method utilizing a cargo transfer carrier to expedite the process of unloading cocoa beans from a ship and transporting the cocoa beans to a nearby terminal or warehouse for storage.

BACKGROUND OF THE INVENTION

Cargo ships have been used for hundreds of years for the transportation of break bulk goods such as cocoa beans, coffee, sugar and rice. Typically, the goods are shipped from a country where the goods are grown where manual labor may be plentiful and relatively inexpensive to a more industrialized country where the goods are processed and/or consumed and where labor costs become a significant expense.

In the shipping industry, profit is made by keeping the ships on the move without significant delays in docking time for loading and unloading of goods which are being transported. When a ship comes to port, depending on the harbor, pilot tugs or the like may be employed to bring the ship to dock. Once docked, it is relatively impractical and inefficient to move the ship until it is ready to depart for its next destination.

Conventional ships have on-board crane systems to assist in the loading and unloading of cargo. Due to the limited reach of such crane systems, after a ship is docked, there is a relatively fixed embarkation/debarkation area on the dock defined by the reach of the ship's crane.

The shipping of break bulk goods such as cocoa beans from third world nations to the United States provides an example of the conventional shipping process. The cocoa beans are grown abroad, harvested and packed into 150 pound sacks. The sacks are transported to the dock area where they are placed on pallets having lifting slings attached, commonly referred to as a sling and/or sling load of cocoa beans. A typical sling of cocoa beans contains 30–35 sacks.

The slings of cocoa beans are arranged in groups adjacent to each other, the number of slings per group preferably equalling the capacity of the on-board crane which the ship employs. In view of the low labor cost in third world countries, it is not unusual to have the entire preparation operation done by manual labor. Accordingly, when the empty ship docks to pick up a load of cocoa beans, appropriate groups of slings of cocoa beans are in place on the dock to be loaded onto the ship by the ship's crane.

Typically, for a ship with a large capacity crane, only one or two groups of slings can be positioned on the dock in the embarkation area for the ship. As the ship's crane lifts the first group of slings and transfers the group into the ship's cargo hold, more slings of cocoa beans are assembled in the space vacated by the first group. The loading process continues until a desired number of sling groups are aboard the ship. As the groups of slings are placed in the hold of the ship, the groupings of slings remain intact to facilitate off-loading without any unnecessary handling.

Once loaded, the ship departs and sails to its destination such as a port in the U.S. When the ship docks, crews of stevedores stand ready to assist in the off-loading of the cocoa beans. The off-loading commences with the ship's crane being utilized to transfer the groups of slings of cocoa beans from the ship's hold to the dock within the debarkation area defined by the reach of the ship's crane. Once the first group of slings of cocoa beans are in the debarkation area, they must be moved before subsequent sling groups of cocoa beans can be unloaded from the ship's hold.

Conventionally, stevedores employ forklifts to remove the slings from the debarkation area of the dock to a storage area, such as a warehouse. As soon as the slings are released from the crane, forklift operations commence. This method of ship unloading has been employed for many years and has been a reasonably satisfactory method of unloading break bulk goods such as cocoa beans from a ship.

Over the years, the capacity of ship cranes has gradually increased. At one time ship crane capacity was on the order of the 6–8 slings. That capacity has increased with newer cranes having the capacity of 10, 12 or 14 sling loads. Currently, the fourteen sling capacity crane is the largest crane used in commercial shipping of cocoa beans.

Applicant recognized that an alternative to the conventional off-loading method was needed to take better advantage of the larger capacity cranes now in use in commercial shipping. Applicant further recognized that the conventional dock handling procedures were in fact problematic, limiting to off-loading time and unnecessarily labor/cost intensive. For example, where a six sling capacity crane was used in off-loading, stevedores using forklifts could relatively easily remove the cocoa beans slings from the debarkation area without impeding the efficient utilization of the ship's crane. However, additional stevedore crew and forklifts were required to remove fourteen sling loads of cocoa beans from the debarkation area to the storage area to keep pace with the unloading of cocoa beans fourteen slings at a time with a fourteen sling capacity crane. Even with the addition of more stevedore crews and additional forklifts, at additional labor intensive cost, the congestion of forklifts and labor activity on the dock inherently limits the entire off-loading process to approximately 180–200 tons per hour. Accordingly, as set forth below, applicant has developed a new method of off-loading break bulk goods from ships in order to improve off-loading efficiency which has achieved off-loading rates as high as 380–400 tons per hour with lower labor costs.

SUMMARY OF THE INVENTION

The present invention provides an improved method for unloading break bulk goods from a ship which has a crane having at least a ten sling capacity and transporting the goods from the debarkation area in a highly efficient manner. A specially designed a cargo transfer carrier is provided for use in the unloading of the break bulk goods.

The cargo carrier comprises a plurality of longitudinal frame members connected by a plurality of crossmembers with decking affixed thereto to form a horizontal carrier bed. The horizontal bed is of a sufficient size to accommodate the placement of a group of at least ten, but preferably fourteen, sling loads of break bulk goods thereon with allowance for a perimeter work area. A gooseneck portion including a vertical frame portion and an elevated horizontal frame portion with decking affixed thereto is supported by a first end of the bed. Tractor attachment means is affixed to the underside of the horizontal frame portion of the gooseneck. A plurality of wheel assemblies are mounted to the longitudinal frame members at an opposite end of the bed from the gooseneck. Each wheel assembly includes an independently mounted, solid, treadless tires affixed to a maintenance-free hub assembly.

The method comprises positioning the specially designed cargo carrier in the debarkation area directly beneath an unloading position of the ship's crane, using the ship's crane to transfer at least ten sling loads of break bulk goods from the ship to the positioned cargo carrier in a single operation, removing the loaded cargo carrier from the debarkation area, and repeating the process with additional cargo carriers. Preferably, the loaded cargo carriers are taken from the debarkation area directly to a warehouse.

It is an object of this invention to provide an improved method to expedite the process of unloading cargo from a ship.

It is an object of this invention to provide a cargo transfer carrier which can accommodate the size and weight of at least ten, but preferably fourteen or more, sling loads of break bulk goods.

BRIEF DESCRIPTION OF THE DRAWINGS

FIG. 2 is a side view of the cargo transfer carrier of FIG. 1.

FIG. 3 is a plan view of the cargo transfer carrier of FIG. 1.

FIG. 4 is an enlarged side view taken along line 4—4 in FIG. 3.

FIG. 5 is a section view taken along line 5—5 in FIG. 4.

DETAILED DESCRIPTION OF THE PREFERRED EMBODIMENT

Figure 1:
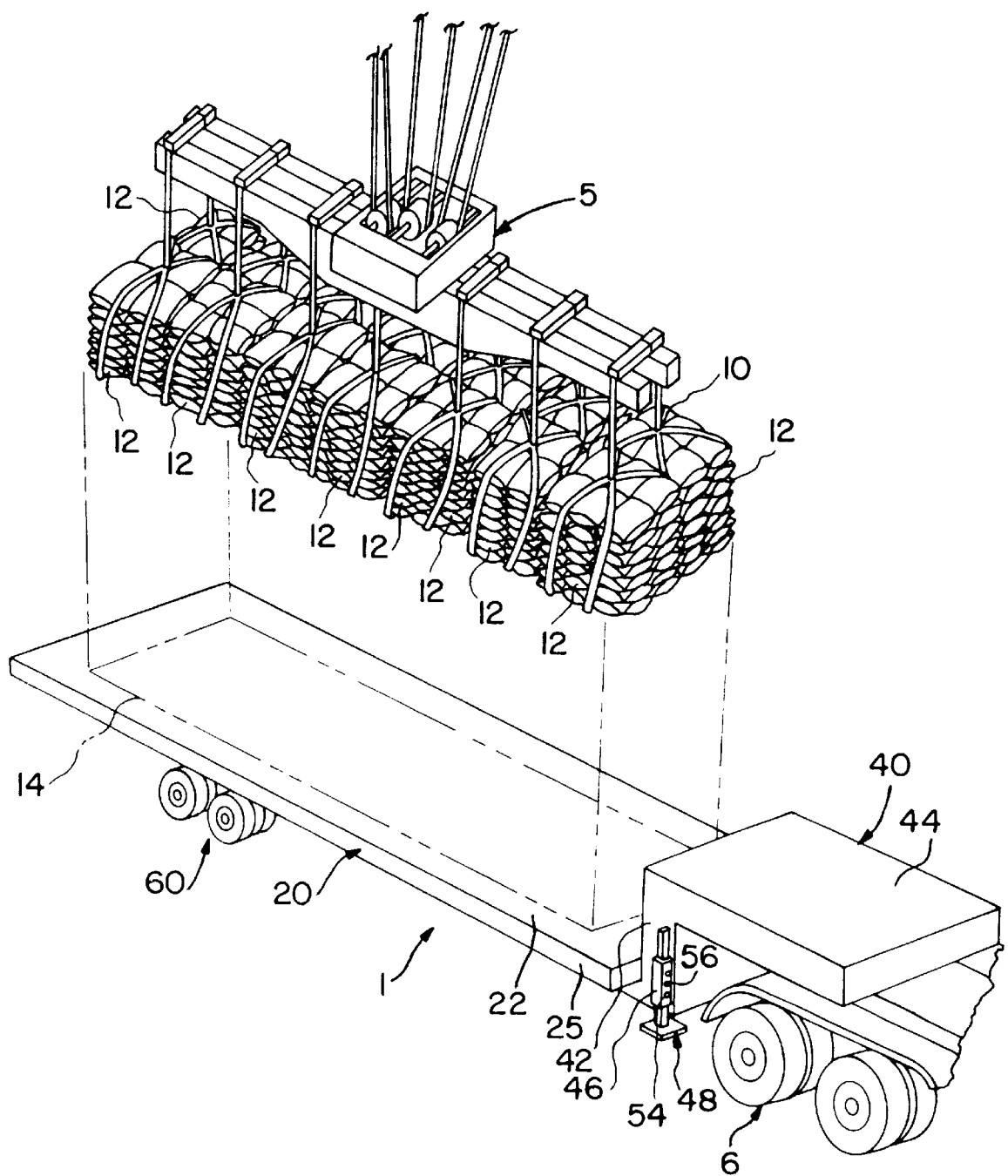
FIG. 1 is a perspective view of a cargo transfer trailer in accordance with the present invention as it is being loaded with fourteen sling loads of cocoa beans.

The ship off-loading method and cargo transfer carrier of the present invention will be described with reference to the drawing figures. In order to provide a clear description of the invention, the ship off-loading method utilizing the cargo transfer carrier will be described first with reference to FIG. 1, followed by a detailed description of the construction of the cargo transfer carrier.

Referring to FIG. 1, the cargo transfer carrier 1 is shown just prior to receiving a group of fourteen sling loads of break bulk cargo as it is being unloaded from a ship. The sling loads of cargo 12 are rigged with slings 10 to the cargo crane 5 of a ship (not shown). The cargo transfer carrier 1 is positioned on the dock in the cocoa bean debarkation area i.e. beneath an unloading area of the ship's crane. The cargo crane 5 lifts the slings 10 as a group from the ship's hold and carries them to a position directly above the bed assembly 20 of the cargo carrier 1. After the group of sling loads of cargo is properly positioned above the bed 20 of the carrier 1, the cargo is lowered directly onto the bed and the slings 10 are released. A tractor is connected to the cargo carrier and the cargo is then hauled directly to a nearby terminal or warehouse for storage.

In the preferred mode of use, the break bulk cargo consists of cocoa beans and each sling load weighs approximately 4500 pounds. For maximizing efficiency, at least ten, but preferably 14, sling loads of cargo are handled in each group of slings. By utilizing the cargo transfer carrier 1 for unloading cocoa beans from a ship, off-loading rates of approximately 380 to 400 tons per hour of cocoa beans have been achieved versus 180 to 200 tons per hour off-loading rates achieved by the prior known method.

The cargo transfer carrier 1 shown in FIG. 1 is designed specifically to expedite the unloading process for cocoa beans. The cargo transfer carrier 1 is comprised of a bed assembly 20 with a gooseneck assembly 40 attached at one end. Wheel assemblies 60 are located toward the opposite end of the bed 20 from the gooseneck assembly 40. Jacks 48 are attached on either side of the gooseneck assembly to support the front end of the carrier 1 after it is disengaged from a tractor 6.

The footprint of a single sling load is approximately 5½ feet by 6 feet. The footprint 14 for a group of fourteen sling arranged in two rows of seven is approximately 11 feet by 42 feet. Accordingly, the cargo bed is preferably dimensioned approximately 12 feet by 44 feet to accommodate a group of fourteen slings while leaving a perimeter work area open of at least one half-foot per side. The perimeter work area permits dock workers easy access to detach the slings from the crane and facilitates unloading the cargo carrier.

Referring to FIGS. 2 and 3, the detailed structure of the carrier 1 is shown. For clarity in FIG. 3 the decking 22 is not shown. The bed assembly 20 is comprised of six longitudinal frame members 28 which run the entire bed length. Cross frame members 30 are connected between the longitudinal frame members 28 at approximately four foot intervals. In order to carry the weight of fourteen sling loads of cargo 12, the longitudinal beams are reinforced by channel sections 32 to increase the moment of inertia (I) of the longitudinal frame members to increase the load carrying capability. In the preferred embodiment, the longitudinal and cross frame members are fabricated from 4"×10"×⅜" rectangular steel tubing. Decking 22 is attached to the frame members 28 and 30 to form the surface of the bed assembly 20. In the preferred embodiment, the decking 22 is fabricated from ½" flat plate. An edge member 25 is attached along both sides of the bed. In the preferred embodiment, the edge member is comprised of 4" square tubing. A closing member 34 is affixed to the rear of the bed assembly. In the preferred embodiment, the closing member is 4"×10"×⅜" channel.

A gooseneck 40 is attached to the front end of the bed assembly 20. Vertical frame members 43 are affixed to the front of the bed assembly. Horizontal frame members 45 are cantilevered from the top end of the vertical frame members 43. Cross members 49 are attached between the horizontal frame members 45 to-form the horizontal deck 44. A tractor attachment 47 is afixed to the underside of the horizontal frame. The face plate 42 is affixed to the vertical frame members 43. The elevated deck portion 44 is covered with a grate 52.

Affixed along each side of the outboard vertical frame members 43 are square tubes 46 in which jacks 48 are slidably disposed. Aligned apertures 54 are located in the tube 46 and the jack 48 and a pin 56 is inserted through one set of aligned apertures 54 in a manner known to those skilled in the art to allow for adjustment of the jacks 46 between a raised and a lowered position.

Referring to FIGS. 4 and 5, the wheel assemblies 60 are shown in detail. The wheel assemblies 60 are arranged in two rows of six wheels each. The wheel assemblies 60 are mounted to frame members 58, which are affixed to the underside on longitudinal frame members 28 of the bed assembly 20. The wheel assemblies are located at a sufficient distance from the end of the carrier 1 so that the carrier 1 can be pulled up a ramp having a 5° incline without the end of the carrier 1 dragging against the level area at the base of the ramp. In the preferred embodiment, this is approximately 16 feet from the end of the carrier 1.

The wheel assemblies 60 are comprised of solid, treadless tires 62 mounted on heavy-duty metal rims 64. Each tire 62 and rim 64 is mounted on a maintenance free, dual roller bearing, sealed hub assembly 66. The hub assemblies are attached to the wheel support frame members 58. Each wheel assembly 60 is capable of supporting approximately 12,000 pounds. In the preferred embodiment, the wheel support frame member is 12"×12"×½" square tubing and the wheel base is approximately 33½ inches. The tires are ITL "innacush" 7.50×15×6.50 solid smooth tread.

While the cargo transfer carrier 1 and ship off-loading method have been described in terms of the preferred embodiment for use with unloading cocoa beans, it will be appreciated by those skilled in the art that similar cargo transfer carriers and similar ship off-loading methods can be used for other break bulk goods to expedite the ship off-loading process and are within the scope of the present invention. Additionally, based on the overall size of the trailer and the low undercarriage height it is also ideal for the off-loading and movement of other oversized cargo that come off vessels.

I claim:

1. A cargo transfer carrier for use in unloading and transporting large groups of break bulk goods from a ship comprising:

a plurality of longitudinal frame members connected by a plurality of cross members;

a horizontal bed defined by decking affixed to said frame and cross members;

said horizontal bed having a width not less than twelve feet to accommodate a group of at least 10 sling loads of break bulk goods arranged in two rows having a footprint of approximately eleven feet in width such that a group of at least 10 slings of break bulk goods may be lowered by a crane onto said bed leaving at least one-half foot of decking on each side of the carrier open as a work area to facilitate loading of the multi-sling group of break bulk goods onto the bed and easy detachment of the slings from the crane;

a gooseneck including a vertical frame portion and a horizontal frame portion having an underside attached to a first end of the bed;

a tractor attachment member affixed to the underside of the horizontal frame portion of the gooseneck; and a plurality of independent wheel assemblies mounted to the longitudinal frame members, each wheel assembly including an independently mounted, solid, treadless tire affixed to a hub assembly such that the load capacity of the carrier is not less than 31.5 tons.

2. A cargo transfer carrier according to claim 1 wherein said horizontal bed is at least forty three feet in length to accommodate a group of 14 sling loads of break bulk goods arranged in two rows having a foot print approximately eleven feet by forty two feet while leaving a perimeter of at least one-half foot of decking open for a work area.

3. A cargo transfer carrier according to claim 2 wherein said horizontal bed is twelve feet wide and forty four feet long.

4. A cargo transfer carrier according to claim 1 having at least twelve wheel assemblies organized in three independent groups, each wheel assembly having a 12,000 lbs. load capacity.

5. A cargo transfer carrier according to claim 4 wherein said independent group includes four wheel assemblies arranged in two rows, each said row comprised of two wheel assemblies axially aligned with each other, with each said row in tandem alignment with the other said row.

6. A cargo transfer carrier according to claim 1 further comprising a pair of support jacks mounted proximate said gooseneck portion for supporting said cargo carrier when said cargo carrier is not attached to a tractor.

7. A cargo transfer carrier according to claim 1 wherein said independent group includes a plurality of wheel assemblies arranged in two rows, each said row comprised of a plurality of wheel assemblies axially aligned with each other whereby every load bearing wheel of said cargo carrier is disposed in one of said two rows.

8. A cargo transfer carrier for use in unloading and transporting large groups of break bulk goods from a ship comprising:

a horizontal bed at least twelve feet wide having decking affixed thereto for receiving slings of break bulk goods lowered by a crane onto said bed such that at least one-half foot of decking on each side of the carrier is left open as a work area to facilitate loading of the break bulk goods onto said bed and easy detachment of the slings from the crane;

a gooseneck including a vertical portion and a horizontal portion having an underside, said gooseneck attached to a first end of said bed such that the underside of said horizontal portion is higher than said horizontal bed;

a tractor attachment member affixed to the underside of said horizontal portion of said gooseneck; and a plurality of independent wheel assemblies mounted beneath said bed, each wheel assembly including an independently mounted, solid tire affixed to a hub assembly such that the carrier, when loaded, can be pivoted on said wheels without risk of tire blowout.

* * * * *